United States Patent [19]
Jackson et al.

[11] Patent Number: 5,616,997
[45] Date of Patent: Apr. 1, 1997

[54] AUTO UP WINDOW WITH OBSTACLE DETECTION SYSTEM

[75] Inventors: James A. Jackson, Dayton; Roy A. McCann, Kettering, both of Ohio

[73] Assignee: ITT Automotive Electrical Systems, Inc., Auburn Hills, Mich.

[21] Appl. No.: 540,696

[22] Filed: Oct. 10, 1995

[51] Int. Cl.⁶ ................................................. H02P 3/00
[52] U.S. Cl. .............................. 318/467; 318/286; 49/28
[58] Field of Search .................................... 318/280–286, 318/466–472, 490; 49/26, 27, 28, 118; 160/291, 292, 293.1; 307/9.1, 10.1

[56] References Cited

U.S. PATENT DOCUMENTS

| | | |
|---|---|---|
| 2,875,464 | 3/1959 | Collins . |
| 4,051,420 | 9/1977 | Tanikoshi ................................ 318/254 |
| 4,194,129 | 3/1980 | Dumbeck ................................ 318/490 |
| 4,562,389 | 12/1985 | Jundt et al. ........................ 318/469 X |
| 4,574,226 | 3/1986 | Binder ................................ 318/434 X |
| 4,585,981 | 4/1986 | Zintler . |
| 4,662,575 | 5/1987 | Juzswik et al. . |
| 4,683,975 | 8/1987 | Booth et al. . |
| 4,709,196 | 11/1987 | Mizuta . |
| 4,922,171 | 5/1990 | Ohi ..................................... 318/468 X |
| 4,931,714 | 6/1990 | Yamamoto . |
| 4,942,349 | 7/1990 | Millerd et al. . |
| 4,970,446 | 11/1990 | Yaguchi . |
| 4,980,618 | 12/1990 | Milnes et al. . |
| 4,994,724 | 2/1991 | Hsu . |
| 5,039,925 | 8/1991 | Schap . |
| 5,105,131 | 4/1992 | Schap . |
| 5,278,480 | 1/1994 | Murray . |
| 5,396,161 | 3/1995 | Doi et al. ............................... 318/807 |
| 5,483,135 | 1/1996 | Parks ....................................... 318/469 |

*Primary Examiner*—Jonathan Wysocki
*Attorney, Agent, or Firm*—Thomas N. Twomey; J. Gordon Lewis

[57] ABSTRACT

A closure system for a motor vehicle includes a closure, a closure frame, an electric motor, a control switch, an electric power source, first and second displacement sensors, temperature sensor, voltage sensor of the power source and a microprocessor. The first and second displacement sensors each operably generate a signal indicative of the one of closure movement and output shaft rotation. The microprocessor is electrically connected to the control switch, the electric motor, the first and second displacement sensors, the temperature sensor and the voltage sensor of the power source. The microprocessor includes electrically connecting the motor with the power source responsive to a condition of the control switch. The microprocessor also has means for converting temperature sensed to an electrical signal indicative of the temperature. The microprocessor also includes converting voltage sensed to an electrical signal of power source voltage, and calculating a velocity of one of the closure and the motor between predetermined positions as indicated by transition signals from the displacement sensors as the closure is moved from an open position to the seated position. The microprocessor further includes calculating a compensated velocity by using the calculated velocity and the voltage signal and the temperature signal. The microprocessor yet further includes comparing the velocity with a reference velocity and electing to reverse the motor when the compensated velocity is less than the reference value.

9 Claims, 3 Drawing Sheets

AUTO UP WINDOW WITH OBSTACLE DETECTION SYSTEM

BACKGROUND OF THE INVENTION

The present invention relates to a power drive system for motor vehicle closures such as windows. It is particularly directed to an automatic reverse feature for power driven closures which, in normal operation, continue closing motion automatically after a user switch has been released.

Some motor vehicles are available with a power window system having an auto-up mode of operation. In these systems, a window will continue to move up even after the user switch has been released. A government mandated motor vehicle standard requires that a window operating in the auto-up mode must reverse direction before it exerts a 100N force on a 10N per mm compliant cylindrical rod between the window and window frame.

It is desired to provide a highly reliable auto reverse feature for use with windows having an auto-up mode of operation requiring a minimum of computing power, enabling the use of an inexpensive microprocessor to reliably control window movement.

SUMMARY OF THE INVENTION

In accordance with the present invention, a closure system for a motor vehicle includes a closure, a closure frame, an electric motor, a control switch, an electric power source, first and second displacement sensors, means for sensing a temperature, means for sensing a voltage of the power source and a microprocessor. The electric motor has an output shaft. The closure frame defines a seated position of the closure. An electrical power source includes a battery. The first and second displacement sensors each operably generate a signal indicative of the one of closure movement and output shaft rotation. The microprocessor is electrically connected to the control switch, the electric motor, the first and second displacement sensors, the means for sensing a temperature and the means for sensing a voltage of the power source. The microprocessor includes means for electrically connecting the motor with the power source responsive to a condition of the control switch. The microprocessor also has means for converting temperature sensed to an electrical signal indicative of the temperature. The microprocessor also includes means for converting voltage sensed to an electrical signal of power source voltage, and means for calculating a velocity of one of the closure and the motor between predetermined positions as indicated by transition signals from the displacement sensors as the closure is moved from an open position to the seated position. The microprocessor further includes means for calculating a compensated velocity by using the calculated velocity and the voltage signal and the temperature signal. The microprocessor yet further includes means for comparing the velocity with a reference velocity and electing to reverse the motor when the compensated velocity is less than the reference velocity.

Other advantages and features of the invention will become apparent by reference to the following specification and to the drawings.

DETAILED DESCRIPTION OF THE PREFERRED EMBODIMENT

Figure 1:
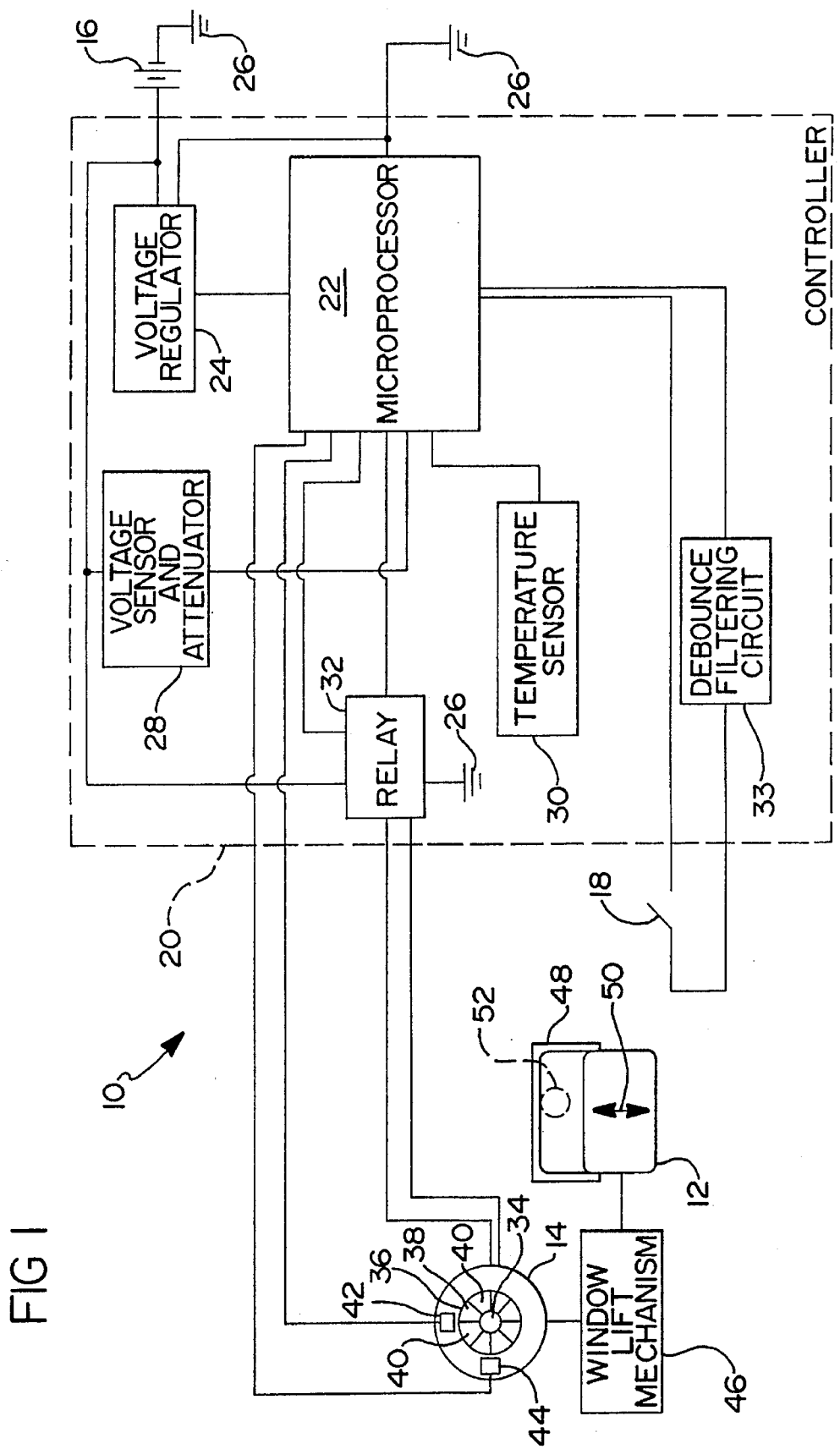
FIG. 1 is a schematic representation of an auto-up window with the obstacle detection system of the present invention.

A window lift system 10 is shown in schematic form in FIG. 1. The exemplary closure, a window 12, is selectively driven by a fractional horsepower electric motor 14 selectively energized by a conventional 12 volt battery 16. An operator controlled input switch 18 is electrically connected to a controller 20 disposed between battery 16 and motor 14. Controller 20 has a microprocessor 22, the preferred type being an eight bit Motorola microprocessor number MC68HC05P9. Input switch 18 is connected to microprocessor 22.

A voltage regulator 24 is disposed between battery 16 and microprocessor 22. The exemplary voltage regulator 24 is an LM2931 from National Semiconductor and regulates the anticipated nine to sixteen volt potential of battery 16 down to five volts required to drive microprocessor 22. Regulator 24, battery 16 and microprocessor 22 are connected to a common electrical ground 26.

Voltage sensor and attenuator 28, an exemplary one being number LM2904 from National Semiconductor, is disposed between battery 16 and an A/D converter input port of microprocessor 22. Voltage sensor 28 attenuates a voltage signal from battery 16, scaling a zero to sixteen volt battery output range to a proportionate zero to five volt signal suited for use by microprocessor 22.

A temperature sensor 30, the preferred type of which is a negative temperature coefficient resistor, is electrically connected with microprocessor 22 and disposed within controller 20. The benefit of placing temperature sensor 30 within controller 20 is the minimization of external connections and improved packaging, however, sensor 30 could alternatively be located outside controller 20. Additionally, other types of temperature sensors could be used in place of the negative temperature coefficient resistor, such as a bimetalic thermocouple, or a thermocouple and amplifier combination.

A relay 32, number V2R1001 from Potter and Brumfield, is disposed between battery 16 and motor 14 and is also electrically connected to microprocessor 22. Relay 32 electrically connects motor 14 with battery 16 responsive to control signals from controller 22. Relay 32 is used to selectively energize the motor 14 to rotate motor shaft 34 in either direction.

Typically, relay 32 closes responsive to closure of input switch 18. However, to avoid an intermittent stop-start condition with the closure of switch 18, a debounce filtering circuit 33 is disposed between switch 18 and controller 20. The details of circuit 33 are not disclosed herein, as they are well known in the art.

Motor shaft 34 of electric drive motor 14 has a magnetic ring 36 mounted thereon with eight magnetic poles, alternating north 38 and south 40. First and second hall effect sensors 42 and 44 respectively, an exemplary type being number A3187EUA from the Allegro Company, are mounted proximate to magnetic ring 36. One hall effect sensor would be sufficient to monitor motor shaft rotation. However, two sensors 42 and 44 are needed to determine the direction of motor shaft rotation.

A window lift mechanism 46 functionally connects motor 14 with window 12, translating rotary motion of motor 14 into movement within window frame 48 in the axial direction 50. Well known window lift mechanism include cable drives, tape drives, and rack and pinion systems, among others. For most window lift mechanisms, vertical displacement of window 12 as a function of rotation of motor shaft 34 is a linear, or near-linear function. Thus, displacement of window 12 is easily correlated to the rotation of motor shaft 34, and the vertical velocity of window 12 correlated to the rotational velocity of motor shaft 34.

An obstacle 52 placed in the path of window 12 is engaged by window 12 with upward movement thereof.

Figure 2:
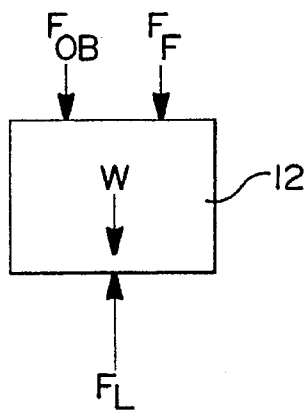
FIG. 2 is a schematic representation of the forces acting on a vertically sliding closure, such as a window.
Figure 3:
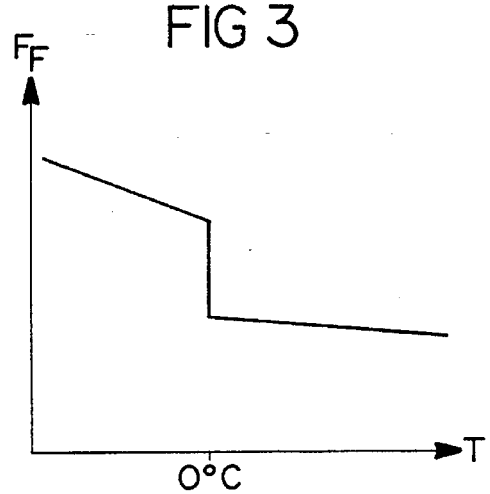
FIG. 3 is a plot of closure drag force as it varies with temperature.

FIG. 2 illustrates the force equilibrium of window 12 when moving at a steady state speed. Lifting force $F_L$ must overcome weight W of the window and drag or frictional forces $F_F$. $F_F$ is largely influenced by the stiffness of closure seals (not shown), and the amount of contact between the seals and window 12 during window movement. When obstacle 52 is impinged against by window 12, $F_L$ must also overcome the resisting force of the obstacle, $F_{OB}$. Therefore, $F_L=W+F_F+F_{OB}$. $F_F$ is a temperature dependent variable which varies discontinuously in step-like fashion, as well as changing its slope, at a single transition temperature $T_G$ as shown in FIG. 3. At temperatures above 0° C., $F_F$ has a first slope. At temperatures below 0° C., $F_F$ has a second slope, appreciably steeper than the first slope of $F_F$.

The source of lifting force $F_L$ is electric motor 14. The torque available from motor 14 ($T_m$) is multiplied by a linkage factor ($K_L$) which may vary with window position (X). Similarly, motor shaft angular displacement (θ) or angular velocity (ω) can be converted to window position (X) or velocity (V) by dividing by $K_L$.

Figure 4:
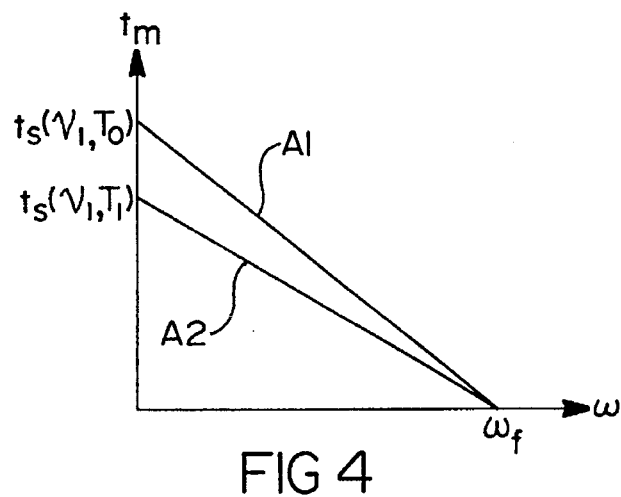
FIG. 4 is a plot of torque as it varies with motor rotational speed at two different motor temperatures.
Figure 5:
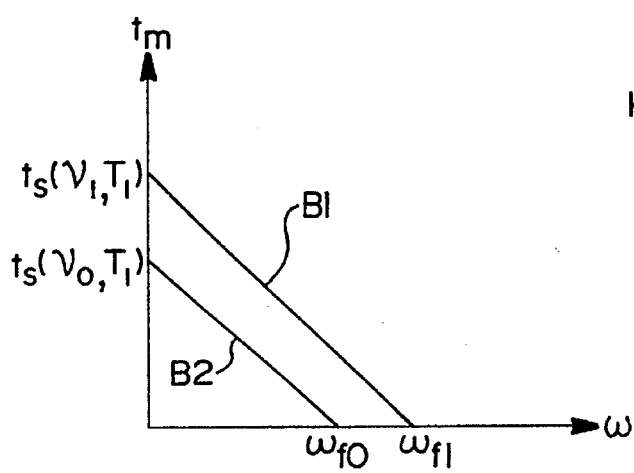
FIG. 5 is a plot of motor torque as a function of motor rotational speed for two different voltages.

FIGS. 4 and 5 both show plots of motor torque $t_m$ as a function of motor shaft angular velocity ω. For a given voltage level, the available torque $t_m$ decreases linearly as speed ω increases. Alternatively stated, as torque $t_m$ is increased, speed ω decreases. Given this relationship, if a window moving toward the seated position impinges on obstacle 52, increasing $F_L$ from $W+F_F$ to $W+F_F+F_{OB}$, then speed ω will decrease proportionately. Therefore, by determining if there has been a change in speed, it is possible to determine if an obstacle has been impinged against by window 12. It is difficult, however, to establish a reference speed suitable for determining if an obstacle has been encountered because speed also varies with temperature and voltage applied.

FIG. 4 shows the effect of varying the motor temperature on the available torque from the motor. For a given voltage $v_1$ at temperatures $T_o$ and $T_1$, the stall torque $t_S$ where the motor shaft 34 is not permitted to rotate, indicated by line $A_1$ for $T_0$ and line $A_2$ for $T_1$, decreases with temperature in accord with the following equation:

$$t_S(T_1)=t_S(T_o)*(1/1+\alpha(T_1-T_o)),$$

where α is the temperature coefficient of resistance of the coil windings. At both temperatures $T_o$ and $T_1$, torque varies linearly with shaft speed W. As torque is reduced to zero, motors at both temperatures reach the same free spin speed $\omega_F$.

If one assumes that the change in temperature has no effect on drag force $F_F$, then an increase in temperature will result in a decrease in speed ω along with an associated decrease in slope, and conversely a decrease in temperature will result in an increase in speed associated with an increase in slope of the torque-speed line. However, the temperature induced change in drag force $F_1$ with temperature change is of such a large magnitude, that it completely overwhelms the temperature effect on motor speed ω. Therefore, the net temperature effect is that as temperature increases, speed increases, and as temperature decreases, speed decreases.

FIG. 5 is a plot of available motor torque $t_M$ as a function of motor speed ω at a constant temperature for two different voltage levels $v_1$ and $v_0$. Line B1 shows the change in torque with the increase in output shaft rotational speed ω for voltage $v_1$. Line B2, parallel to B1, also shows the change in torque for voltage $v_0$ less than $v_1$. The effect of a change in voltage on the performance of motor 14 is a characteristic of that particular type of motor. For example, a motor's sensitivity may be 383 rpm per volt. Therefore, in FIG. 4, for a given torque, the difference in speed ω between lines B1 and B2 would consistently be 383 rpm if $V_1$ and $V_0$ differ by 1 volt.

An increase in voltage will result in an increase in speed ω for a given torque, and a decrease in voltage will result in a decrease in speed ω associated with a parallel shift of the torque-speed line. Although theoretically, the effect of variance in voltage v on speed ω should be compensated for by the equation $\Delta\omega=S*\Delta v$, where S is the motor's sensitivity to voltage variance, a more simple approach to compensating for voltage variance has been developed. The measured speed is merely divided by the voltage.

Plotting constant voltage motor or window speed curves for ω or V as a function of θ or X respectively will result in a group of substantially parallel lines, with the uppermost being the line for the highest voltage, and the lowest for the lowest voltage. For the closure systems evaluated, it has been found that dividing the speed vs displacement curves by the associated voltage causes the curves to shift to a common curve. This voltage compensated curve allows one to compare measurements of speed as a function of displacement to determine if something other than voltage has caused a change in speed.

Although dividing the speed by the voltage is superficially inconsistent with the theoretical approach to compensating for voltage variation, it is effective when the comparison is made when the motor is operating in a low load condition, well removed from stall conditions. Further, the anticipated voltage range is limited to 9 to 16 volts, avoiding the more apparent non-linearity which occurs as the divisor approaches zero.

Figure 6:
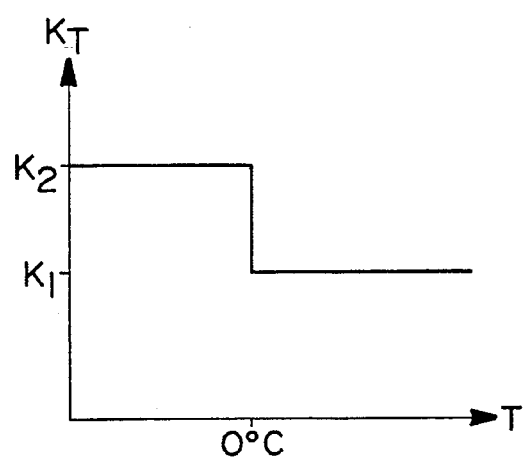
FIG. 6 is a plot of a temperature compensation factor $K_T$ as a function of temperature.

Given the above, a set of instructions in accord with FIG. 6 calculating a value of velocity V and compensating it for both temperature and voltage variations has been placed into microprocessor 22 to determine if an obstacle 52 has been encountered.

The program of FIG. 6 uses a measured value of temperature (T) and voltage (v) and window velocity (V) to develop a compensated velocity value ($V_M$). The compensated velocity value $V_M=V*(1+K_T(T_o-T))/v$. $K_T$ is a temperature compensation factor which simulates the effect of the change in frictional drag forces $F_F$, and the resultant change in velocity, varying with temperature as shown in FIG. 6. $T_o$ is an arbitrarily selected reference temperature. A reference temperature of 25° C. may be convenient if initial velocity measurements are made at that temperature.

A "crush zone" of window travel, approximated by the last one-third of upward window travel, is divided into 200 window positions, with the last position being the seated position of window 12. The number of positions can, of course, be varied to suit the specific application. Each window position corresponds to a corresponding number of rotations of motor shaft 34 as indicated to microprocessor 22 by hall effect sensors 42 and 44. A reference velocity (P) is stored in microprocessor 22 for each of the 200 positions within the crush zone for comparison with compensated velocity $V_M$. By comparing the reference velocity P with compensated velocity $V_M$ at each of the 200 positions of window travel, localized variations in compensated velocity $V_M$ attributable to the linkage configuration and localized variations in seal drag are automatically compensated for.

The 200 reference velocities P for the window are initially set by operating window 12 through its range of travel and storing the values of $V_M$ as P for each of the 200 positions of window 12 in the crush zone. In subsequent operations of window lift system 10, the value of $V_M$ is averaged into P by multiplying P by 7 and adding $V_M$ and dividing the total by 8 to get the new P.

The program is initiated at start block 54 every time an encoder transition is generated. An encoder transition is generated when a transition from north to south or south to north of magnet ring 36 occurs at one of hall sensors 42 and 44 at a rotative position corresponding to each one of the 200 window positions.

Figure 7:
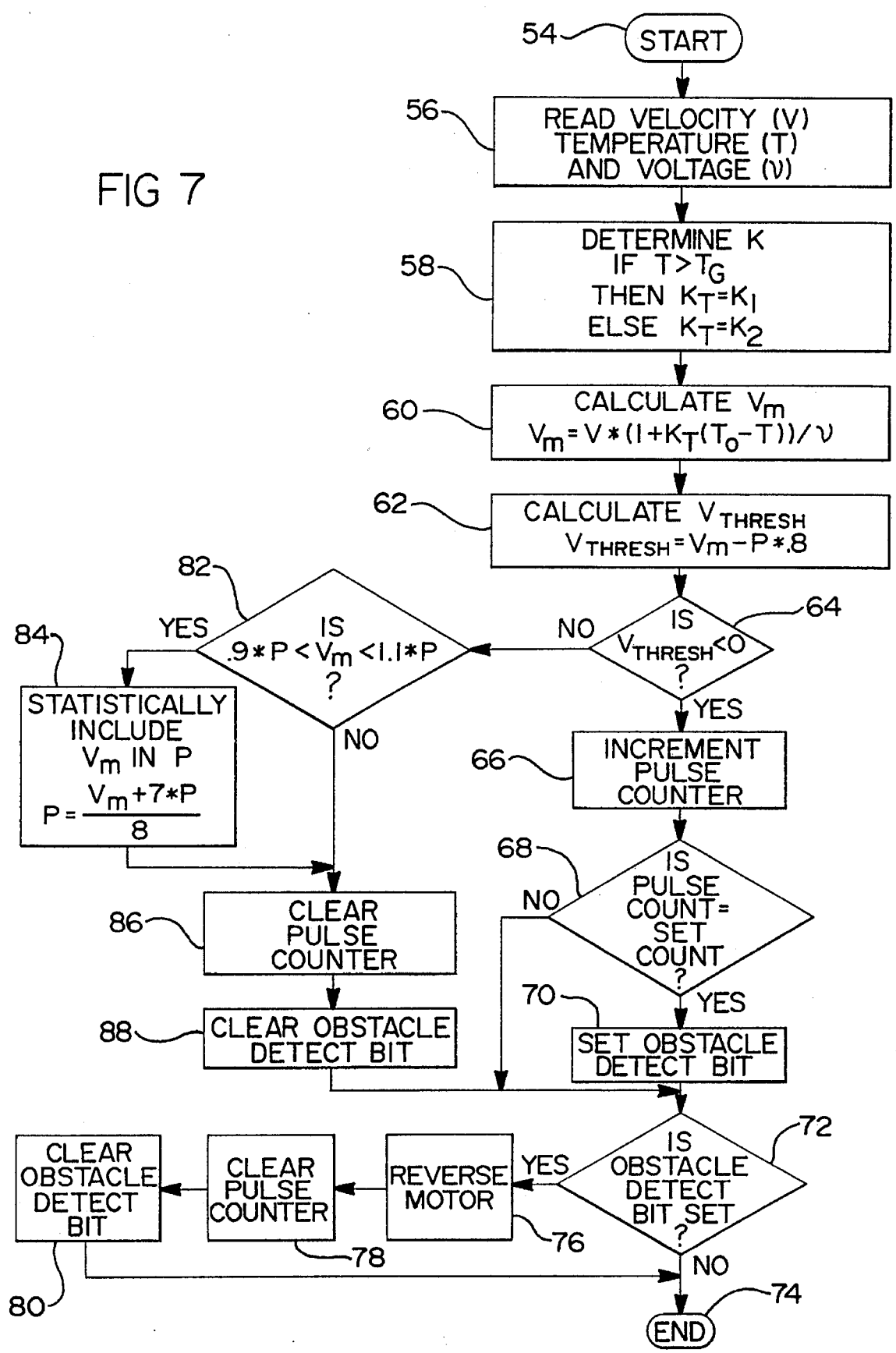
FIG. 7 is a block diagram flow chart showing the logic used to determine whether an obstacle has been impinged against by the closure.

The program of FIG. 7 uses measured values of window velocity (V), voltage (v) and temperature (T) to develop compensated velocity value $V_M=V*(1+K_T(T_o-T))/v$. It has been determined that comparing the compensated velocity $V_M$ to the reference velocity P for that exact location to determine if $V_M$ is appreciably less than P is a highly reliable and repeatable approach to determining whether an obstacle has been impinged upon by the window in its upward travel. It should be appreciated, of course, that the same comparison can be made by multiplying P by v and dividing by $(1+K_T(T_o-T))$ for comparison with V. If V is appreciably less than the modified value P, it would be indicative of window 12 pressing against an obstacle.

The program of FIG. 7, as noted, is executed every time an encoder transition is generated. Start block 54 represents the initiation of the program. In step 56, the velocity, temperature and voltage are read. It is more accurate to state that velocity (V) is calculated, rather than read. Velocity is calculated for a predetermined amount of travel by measuring a period of time for window 12 to travel a predetermined distance, or alternatively, for motor shaft 34 to rotate a predetermined amount, as indicated by hall sensors 42 and 44, and dividing the predetermined distance or angular displacement by the measured time. Any necessary unit conversions can also be stored in the microprocessor and factored into the calculation. As such, the velocity reading is not a true instantaneous velocity reading, but an average velocity calculated for a predetermined amount of displacement. The shorter the time period used, the more the calculated velocity will approximate an instantaneous velocity. However, longer time periods will result in more repeatable velocity values and fewer false indications of an obstacle. Values for temperature and voltage from temperature sensor 30 and voltage sensor 28 respectively are recorded at the appropriate time, thereby providing instantaneous values therefor.

In step 58, constant $K_T$ which varies with temperature has its value determined. $K_T$ is used to approximate the effect of a change in temperature on window seal stiffness. At approximately 0° C. and below, window seals become sufficiently stiff that there is an appreciable increase in resistance to window movement produced thereby. Therefore, $K_T$ has a first value $K_1$, above $T_G$, or 0° C., and a second higher value $K_2$ for temperatures below $T_G$ as shown in FIG. 6.

Compensated velocity $V_M$ is calculated in step 60 according to the above-discussed equation in which $V_M$ equals $V*(1+K_T(T_o-T))/v$.

$V_M$ is compared with P in step 62. To determine if an appreciable decrease in $V_M$ has occurred, indicative of the presence of an obstacle, $V_M$ is compared with P multiplied by a first range factor to obtain a first velocity range value. In the exemplary embodiment, the first range factor is 0.8 and the resultant difference of $V_M-P\times 0.8=V_{THRESH}$, the threshold reference value. The first velocity range factor of 0.8 was selected for the system evaluated because using 0.9 resulted too many false obstacle detection reversals and 0.7 resulted in higher closure forces than desired. However, it is anticipated that other systems might be better served by using a first velocity range factor other than 0.8. For example, a sun roof with consistently low closure efforts may be able to use a value of 0.9 or 0.95 without being troubled by false reversals.

In step 64, the threshold reference value $V_{THRESH}$ is compared with 0. If $V_{THRESH}$ is less than 0, this indicates a significant reduction in compensated velocity and a pulse counter is incremented by adding 1 to the value of the pulse counter in step 66. In step 68, the value of pulse counter is compared with a predetermined set count, five in the present embodiment, to determine if there have been significant velocity reductions at each of the last five window positions. The set count can, of course, be varied from five to suit the specific application. If the number of pulse counts equals the set count, then it is assumed that an obstacle has been detected and the program moves to step 70 and sets an obstacle detect bit.

Proceeding to step 72, if the obstacle detect bit has not been set, then the program moves to end block 74 and terminates. If, in step 72, it is determined that the obstacle detect bit has been set, then it moves to step 76 and reverses the direction of rotation of motor shaft 34 by signaling relay 32 to reverse the voltage being applied to motor 14. After motor 14 has been reversed, releasing obstacle 52, the program moves to step 78, clearing the pulse counter by setting it equal to zero and then initiates step 80, clearing the obstacle detect bit.

If, in step 68, pulse count is not equal to set count, then the program bypasses step 70 and proceeds to step 72, or alternatively, (not shown) directly to end block 74.

If, in step 64, $V_{THRESH}$ is not less than 0, then $V_M$ is compared with upper and lower second velocity range values equal to P multiplied by upper and lower second range factors 0.9 and 1.1 respectively. The range factors 0.9 and 1.1 were selected to avoid including unrepresentatively high or low values in the calculated reference values P. Other values, however, could be employed in place of 0.9 and 1.1, as dictated by the requirements of the system. If $V_M$ falls into the range between the upper and lower second velocity range values, then the program moves on to step 84 where $V_M$ is included in P as described above by multiplying P by 7, adding $V_M$ and dividing the total by 8 to provide a new P. Following step 84, and if $V_M$ is outside of the second velocity range values, the pulse counter is cleared in step 86, and the obstacle detect bit is cleared in step 88. Following step 88, the program proceeds alternatively to either step 72, or (not shown) directly to end block 74.

By thus monitoring the velocity of the window, an inexpensive, yet highly reliable power window system is provided which consistently reverses window direction in response to window impingement against an impediment.

While one embodiment of the invention has been described in detail, it will be apparent to those skilled in the art that the disclosed embodiment may be modified. For example, this same control system could be used with a sun roof or a sliding door instead of a window. Also, the magnet ring could alternatively be fixed to a secondary shaft rotated by the output shaft. Therefore, the foregoing description is to be considered exemplary rather than limiting, and the true scope of the invention is that defined in the following claims.

What is claimed:

1. A power closure system for a motor vehicle comprising:

a closure;

a closure frame defining a seated position of the closure;

a control switch;

an electrical power source including a battery;

an electric motor with an output shaft drivingly connected to the closure and selectively electrically connected to the power source;

a first displacement sensor operably generating a signal indicative of one of closure movement and output shaft rotation;

a second displacement sensor operably generating a signal indicative of one of closure movement and output shaft rotation;

means for sensing a temperature;

means for sensing a voltage of the power source; and a microprocessor electrically connected to the control switch, the electric motor, the first and second displacement sensors, the means for sensing a temperature and the means for sensing a voltage of the power source, and including means for electrically connecting the motor with the power source responsive to a condition of the control switch;

means for converting signals from the displacement sensors into a predetermined number of closure positions;

means for converting temperature sensed to an electrical signal indicative of the temperature at one of the closure positions;

means for converting voltage sensed to an electrical signal of power source voltage at the one of the closure positions;

means for calculating a velocity of one of the closure and the motor as the closure approaches the one of the closure positions;

means for calculating a compensated velocity for the one of the closure positions using the calculated velocity and the voltage signal and the temperature signal; and means for comparing the compensated velocity with a reference velocity for the one of the closure positions and electing to reverse the motor when the compensated velocity is less than the reference velocity.

2. A power closure system for a motor vehicle as claimed in claim 1 wherein the means for comparing the compensated velocity with a reference velocity and electing to reverse the motor when the compensated velocity is less than the reference velocity elects to reverse the motor only when the compensated velocity is less than the reference velocity by a predetermined amount.

3. A power closure system for a motor vehicle as claimed in claim 2 further comprising:

means for revising the reference velocity by including the compensated velocity therein when there is not an election to reverse the motor.

4. A power closure system for a motor vehicle as claimed in claim 2 further comprising:

means for calculating upper and lower second velocity range values by multiplying the reference velocity by predetermined upper and lower second range factors and revising the reference velocity by including the compensated velocity therein when the compensated velocity is between the upper and lower second velocity range values when there is not an election to reverse the motor.

5. A power closure system for a motor vehicle as claimed in claim 1, wherein the means for comparing the compensated velocity with a reference velocity and electing to reverse the motor when the compensated velocity is less than the reference velocity includes:

means for comparing the compensated velocity with a reference velocity and electing to increment a pulse count when the compensated velocity is less than the reference velocity and to clear the pulse count when the compensated velocity is greater than the reference velocity; and means for comparing the incremented pulse count to a predetermined set count and electing to reverse the motor when the incremented pulse count equals the set count.

6. A power closure system for a motor vehicle as claimed in claim 3, wherein the means for comparing the compensated velocity with a reference velocity and electing to reverse the motor when the compensated velocity is less than the reference velocity includes:

means for comparing the compensated velocity with the reference velocity and electing to increment a pulse count when the compensated velocity is less than the reference velocity and to clear the pulse count when the compensated velocity is less than the reference velocity; and means for comparing the incremented pulse count to a predetermined set count and electing to reverse the motor when the incremented pulse count equals the set count.

7. A power closure system for a motor vehicle as claimed in claim 3, wherein the means for comparing the compensated velocity with a reference velocity and electing to reverse the motor when the compensated velocity is less than the reference velocity includes:

means for comparing the compensated velocity with the reference velocity and electing to increment a pulse count when the compensated velocity is less than the reference velocity, and for clearing the pulse count and calculating upper and lower second velocity range values by multiplying the reference velocity by predetermined upper and lower second range factors when the compensated velocity is less than the reference velocity;

means for comparing the compensated velocity with the upper and lower second velocity range values and revising the reference velocity to statistically include the compensated velocity when the compensated velocity is between the upper and lower second velocity range values; and means for comparing the incremented pulse count to a predetermined set count and electing to reverse the motor when the incremented pulse count equals the set count.

8. A power closure system for a motor vehicle as claimed in claim 1, wherein the means for calculating a compensated velocity for the one of the closure positions includes:

means for calculating a temperature correction factor using the electrical signal indicative of temperature and a predetermined referenced temperature; and means for calculating the compensated velocity for the one of the closure positions by dividing the velocity by the voltage signal and multiplying by the temperature correction factor.

9. A method for controlling closure movement in a motor vehicle employing an electric drive motor controlled by a microprocessor including:

mounting a first displacement sensor in a first position relative to a shaft of the electric drive motor;

mounting a second displacement sensor in a second position relative to the shaft of the electric drive motor;

using the first displacement sensor and the second displacement sensor to provide an indication of closure direction and position;

using the microprocessor to calculate a velocity of one of the closure and the motor at a predetermined closure position;

sensing a temperature and converting the temperature sensed to an electrical signal indicative of the temperature at the predetermined closure position;

sensing a voltage and converting the voltage sensed to an electrical signal of power source voltage at the predetermined closure position;

using the microprocessor to calculate a temperature correction factor using the electrical signal indicative of temperature and a predetermined reference temperature;

using the microprocessor to calculate a compensated velocity for the predetermined closure position by dividing the calculated velocity by the voltage signal and multiplying by the temperature correction factor; and comparing the compensated velocity with a stored reference velocity for the predetermined closure position and electing to reverse the motor when the compensated velocity is less than the reference velocity.

* * * * *